US008315590B2

(12) United States Patent
Hapsari et al.

(10) Patent No.: US 8,315,590 B2
(45) Date of Patent: Nov. 20, 2012

(54) EMERGENCY INFORMATION NOTIFICATION SYSTEM

(75) Inventors: Wuri Andarmawanti Hapsari, Yokosuka (JP); Katsutoshi Nishida, Tokyo (JP); Itsuma Tanaka, Yokohama (JP)

(73) Assignee: NTT DoCoMo, Inc., Tokyo (JP)

( * ) Notice: Subject to any disclaimer, the term of this patent is extended or adjusted under 35 U.S.C. 154(b) by 26 days.

(21) Appl. No.: 12/999,865

(22) PCT Filed: Jun. 16, 2009

(86) PCT No.: PCT/JP2009/060957
§ 371 (c)(1),
(2), (4) Date: Mar. 16, 2011

(87) PCT Pub. No.: WO2009/154204
PCT Pub. Date: Dec. 23, 2009

(65) Prior Publication Data
US 2011/0165855 A1 Jul. 7, 2011

(30) Foreign Application Priority Data
Jun. 17, 2008 (JP) .................................. 2008-158449

(51) Int. Cl.
H04M 11/04 (2006.01)
(52) U.S. Cl. ................. 455/404.1; 455/404.2; 455/90.1; 455/63.2; 455/521
(58) Field of Classification Search ................ 455/404.1
See application file for complete search history.

(56) References Cited

U.S. PATENT DOCUMENTS
7,920,053 B2 * 4/2011 Pattok et al. .................. 340/331

2003/0143974 A1 * 7/2003 Navarro ........................ 455/404
2008/0227428 A1 * 9/2008 Rezaiifar et al. ........... 455/404.1

FOREIGN PATENT DOCUMENTS
EP       2 037 596 A1    3/2009
JP       07-220191 A     8/1995
JP       11-195071 A     7/1999
JP       2007-156766 A   6/2007
WO       2007/148703 A1  12/2007

OTHER PUBLICATIONS

3GPP TS 23.041 V10.0.0, Sep. 2010, "Technical Specification Group Core Network and Terminals; Technical realization of Cell Broadcast Service (CBS)," 46 pages.
3GPP TR 23.828 V8.0.0, Sep. 2008, "Technical Specification Group Services and System Aspects; Earthquake and Tsunami Warning System (ETWS), Requirements and Solutions; Solution Placeholder," 22 pages.

(Continued)

Primary Examiner — Olumide T Ajibade Akonai
Assistant Examiner — Randy Peaches
(74) Attorney, Agent, or Firm — Osha Liang LLP

(57) ABSTRACT

An emergency information reporting method, wherein a broadcast equipment (CBC) transmits an emergency information reporting message including a distribution area and emergency information to a switching center (MME) corresponding to the distribution area, the switching center (MME) generates an emergency information reporting message including cell identification information and transmits the message to a wireless base station (eNB) which manages the cell corresponding to the distribution area included in the received emergency information reporting message, and the wireless base station (eNB) broadcasts the emergency information included in the received emergency information reporting message to the cell corresponding to the cell identification information included in the emergency information reporting message.

5 Claims, 6 Drawing Sheets

OTHER PUBLICATIONS

3GPP TS 25.324 V9.0.0, Dec. 2009, "Technical Specification Group Radio Access Network; Broadcast/Multicast Control (BMC)," 26 pages.

Office Action issued on Sep. 15, 2009 in corresponding Japanese Application No. 2008-158449, with translation, 4 pages.

International Search Report issued in PCT/JP2009/060957, mailed on Sep. 29, 2009, with translation, 4 pages.

Written Opinion issued in PCT/JP2009/060957, mailed on Sep. 29, 2009, with translation, 9 pages.

International Preliminary Report on Patentability issued in PCT/JP2009/060957, issued on Feb. 8, 2011, with translation, 10 pages.

* cited by examiner

EMERGENCY INFORMATION NOTIFICATION SYSTEM

TECHNICAL FIELD

The present invention relates to an emergency information notification system configured to notify multiple mobile stations in a distribution area of emergency information.

BACKGROUND ART

3GPP has been studying "ETWS (Earthquake and Tsunami Warning System)" for distributing emergency information (broadcast information) such as earthquake information and tsunami information.

As FIG. 6 shows, a mobile communication system of "EPC (Evolved Packet Core) System" or of "E-UTRAN (Evolved Universal Terrestrial Radio Access Network) System" includes, as a configuration for making notification of such emergency information, a broadcast equipment CBC (Cell Broadcast Center) connected to a CBS provider, a switching center MME (Mobility Management Entity), and a radio base station eNB.

In addition, in such a mobile communication system, a protocol stack between the broadcast equipment CBC and the switching center MME and a protocol stack between the switching center MME and the radio base station eNB are specified as shown in FIG. 7.

SUMMARY OF INVENTION

Technical Problems

The aforementioned mobile communication system of "EPC System" or of "E-UTRAN System," however, does not specify a specific method of how to notify multiple mobile stations in a distribution area of emergency information. For this reason, the aforementioned mobile communication system has the following problem. Specifically, in an environment where multiple mobile communication systems operated by one or more carriers coexist, the aforementioned mobile communication system is not capable of rapidly and correctly notifying multiple mobile stations in a distribution area of emergency information once the CBS provider makes notification of the emergency information.

The present invention is made in view of the above problems and an objective of the present invention is to provide an emergency information notification system which is capable of rapidly and correctly notifying multiple mobile stations in a distribution area of emergency information, in a mobile communication system of "EPC System" or of "E-UTRAN System."

A first aspect of the present invention is summarized as an emergency information notification system configured to notify a plurality of mobile stations in a distribution area of emergency information, the emergency information notification system comprise a radio base station, a switching center and a broadcast equipment configured to transmit an emergency information notification message including the distribution area and the emergency information to the switching center which corresponds to the distribution area, wherein the switching center transfers the received emergency information notification message, to the radio base station which corresponds to the distribution area included in the emergency information notification message, and the radio base station broadcasts the emergency information included in the received emergency information notification message, to a cell corresponding to the distribution area included in the emergency information notification message.

A second aspect of the present invention is summarized as an emergency information notification system configured to notify a plurality of mobile stations in a distribution area of emergency information, the emergency information notification system comprise a radio base station, a switching center, and a broadcast equipment configured to transmit an emergency information notification message including the distribution area and the emergency information to the switching center which corresponds to the distribution area, wherein the switching center transfers the received emergency information notification message, to the radio base station which corresponds to the distribution area included in the emergency information notification message, and the radio base station broadcasts the emergency information included in the emergency information notification message to all cells under control of the radio base station.

A third aspect of the present invention is summarized as an emergency information notification system configured to notify a plurality of mobile stations in a distribution area of emergency information, the emergency information notification system comprise a radio base station, a switching center; and a broadcast equipment configured to transmit an emergency information notification message including the distribution area and the emergency information to the switching center which corresponds to the distribution area, wherein the switching center generates an emergency information notification message including the cell identification information, and transmits the generated emergency information notification message to the radio base station which manages the distribution area included in the received emergency information notification message, and the radio base station broadcasts the emergency information included in the received emergency information notification message, to a cell corresponding to the cell identification information included in the emergency information notification message.

In the first to the third aspect, wherein, in a case where there are a plurality of switching centers which correspond to the distribution area, the broadcast equipment transmits the emergency information notification message to a switching center having the best connection status with the broadcast equipment among the plurality of switching centers.

In the first to the third aspect, wherein, in a case where there are a plurality of switching centers which manage the radio base station, and the radio base station receives the same emergency information notification message from different switching centers, the radio base station broadcasts only the emergency information included in the emergency information notification message which the radio base station receives for the first time.

In the first to the third aspect, wherein, in a case where there are a plurality of switching centers which manage the radio base station, and the radio base station receives the same emergency information notification message from different switching centers, the radio base station discards the emergency information notification messages other than the one which the radio base station receives for the first time.

As described above, according to the present invention, it is possible to provide an emergency information notification system which is capable of rapidly and correctly notifying multiple mobile stations in a distribution area of emergency information, in a mobile communication system of "EPC System" or of "E-UTRAN System.

DESCRIPTION OF EMBODIMENTS (Emergency Information Notification System According to First Embodiment of the Present Invention)

An emergency information notification system according to a first embodiment of the present invention will be described with reference to FIG. 1 to FIG. 5.

Figure 1:
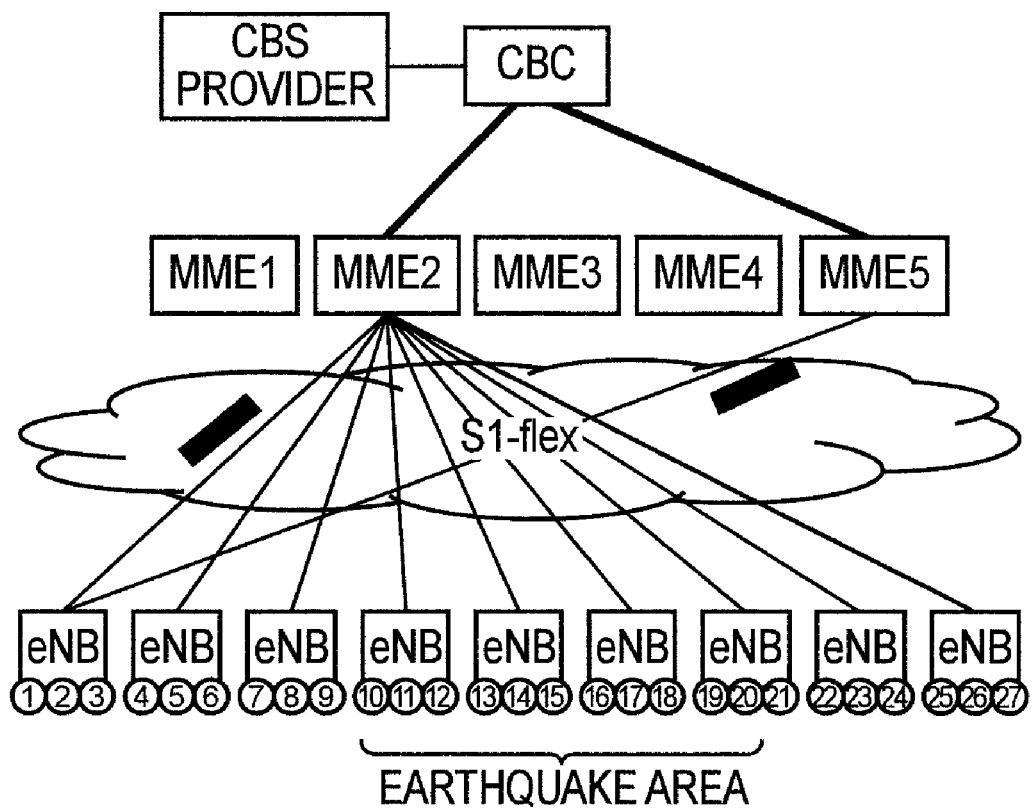
FIG. 1 is an overall configurational view of a mobile communication system according to a first embodiment of the present invention.

As FIG. 1 shows, the emergency information notification system according to this embodiment operates in a mobile communication system of "EPC System" or of "E-UTRAN System." The emergency information notification system includes, as a configuration for notifying multiple mobile stations UE in a distribution area of emergency information, a broadcast equipment CBC connected to a CBS provider, switching centers MME, and radio base stations eNB.

Figure 7:
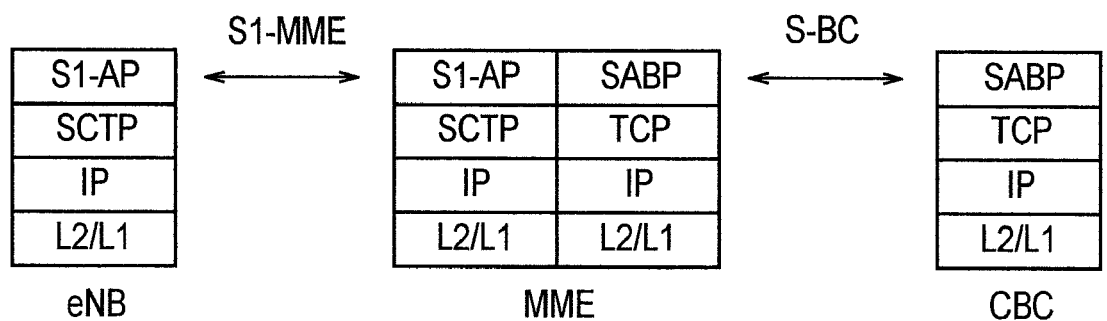
FIG. 7 is a diagram showing protocol stacks of the mobile communication system which provides the ETWS service in the EPC system or in the E-UTRAN system.

In addition, in the emergency information notification system, a protocol stack between the broadcast equipment CBC and the switching centers MME and a protocol stack between the switching centers MME and the radio base stations eNB are the same as the ones shown in FIG. 7.

The broadcast equipment CBC may be connected to multiple switching centers MME which belong to a corresponding one of multiple Pool Areas in PLMN (Public Land Mobile Network).

In this respect, the broadcast equipment CBC may be configured in the following manner. Specifically, when being connected to multiple switching centers MME, the broadcast equipment CBC transmits "ETWS Message (Emergency information notification message)" to each of switching centers MME in a distribution area, or to a particular switching center MME, the "ETWS Message" including emergency information notified from the CBS provider, the particular switching center MME determined by the status of how the particular switching center MME is connected to the broadcast equipment CBC, or specifically, by the status of the transport layer (e.g., "Keep Alive Message" in TCP). Alternatively, the broadcast equipment CBC may transmit "ETWS Message" to all the switching centers MME connected thereto.

For example, once the CBS provider transmits an ETWS message to a given broadcast equipment CBC, the broadcast equipment CBC determines to which switching center MME belonging to which Pool Area the broadcast equipment CBC should transfer the received ETWS message, on the basis of a distribution area included in the ETWS message.

In addition, in the case where the CBS provider transmits an ETWS message to a broadcast equipment CBC which covers a Pool Area corresponding to an area where a disaster or the like has occurred, the broadcast equipment CBC transfers the ETWS message to a switching center MME which has the best status of transport layer among MMEs in the Pool Area, without consideration of the distribution area included in the ETWS message.

Here, it is assumed that a broadcast equipment CBC which corresponding to a particular Pool Area is connected to multiple switching centers MME in the particular Pool Area, i.e., establishes a transport layer with the multiple switching centers MME in the particular Pool Area.

Note that the broadcast equipment CBC may be configured as follows. Specifically, in the case where the broadcast equipment CBC extracts multiple switching centers MME as ones to which the broadcast equipment CBC should transfer the received ETWS message on the basis of a distribution area included in the ETWS message, the broadcast equipment CBC selects a switching center MME having the best status of transport layer among the multiple MMEs thus extracted and transfers the ETWS message to the selected switching center MME.

Likewise, the switching center MME may be configured to transmit the ETWS message received from the broadcast equipment CBC to a particular radio base station (radio base station corresponding to a distribution area, or the like) eNB, or may be configured to transmit the ETWS message to all the radio base stations eNB connected to the switching center MME.

Moreover, the radio base station eNB may be configured to broadcast emergency information included in the ETWS message received from the switching center MME, to a particular cell (cell corresponding to a distribution area, or the like), or may be configured to broadcast the emergency information to all the cells under control of the radio base station eNB.

Note that the radio base station eNB may be configured as follows. Specifically, if receiving the same ETWS message plural times from one or more switching centers MME, the radio base station eNB discards the ETWS message which the radio base station eNB receives for the second time or more.

Hereinbelow, with reference to FIG. 2 to FIG. 5, description will be given of an operation to notify multiple mobile stations UE in a distribution area of emergency information, in the emergency information notification system according to this embodiment Firstly, with reference to FIG. 2, description will be given of a method (1) of transmitting an ETWS message in the emergency information notification system according to this embodiment.

Figure 2:
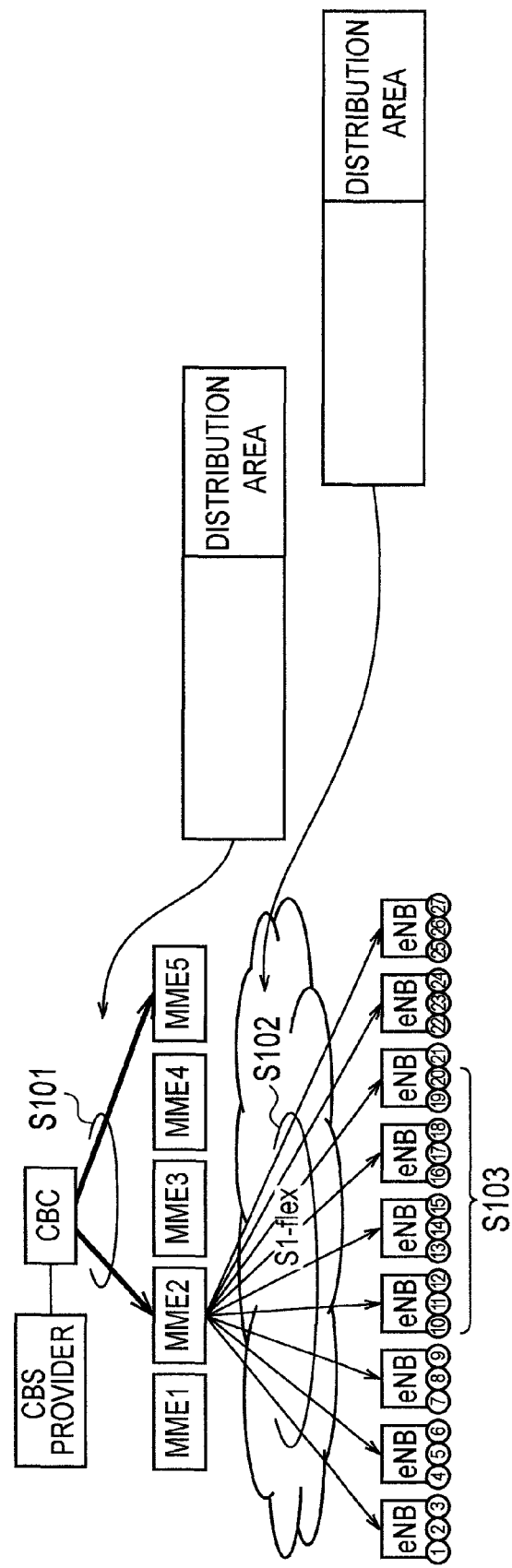
FIG. 2 is a diagram for illustrating a method of transmitting emergency information in the mobile communication system according to the first embodiment of the present invention.

As FIG. 2 shows, in Step S101, on the basis of emergency information received from the CBS provider, the broadcast equipment CBC determines a distribution area of the emergency information. Then the broadcast equipment CBC transmits the ETWS message including the distribution area and the emergency information to switching centers MME2 and MME5 which correspond to the distribution area.

Here, the broadcast equipment CBC stores therein a mapping table for "Distribution Area" and "Switching center," and determines the distribution area of the ETWS message (emergency information) with reference to the mapping table.

In Step S102, the switching centers MME2 and MME5 having received the ETWS message each transfer the received ETWS message to all radio base stations eNB to which the switching center is connected.

In Step S103, the multiple radio base stations eNB having received the ETWS message broadcast the emergency information included in the ETWS message to cells 10 to 20 which correspond to the distribution area included in the ETWS message thus received.

Here, each of the radio base stations eNB stores therein a mapping table for "Distribution Area" and "Cell," and thus extracts a cell corresponding to the distribution area in the ETWS message (emergency information) with reference to the mapping table.

Secondly, with reference to FIG. 3, description will be given of a method (2) of transmitting an ETWS message in the emergency information notification system according to this embodiment.

Figure 3:
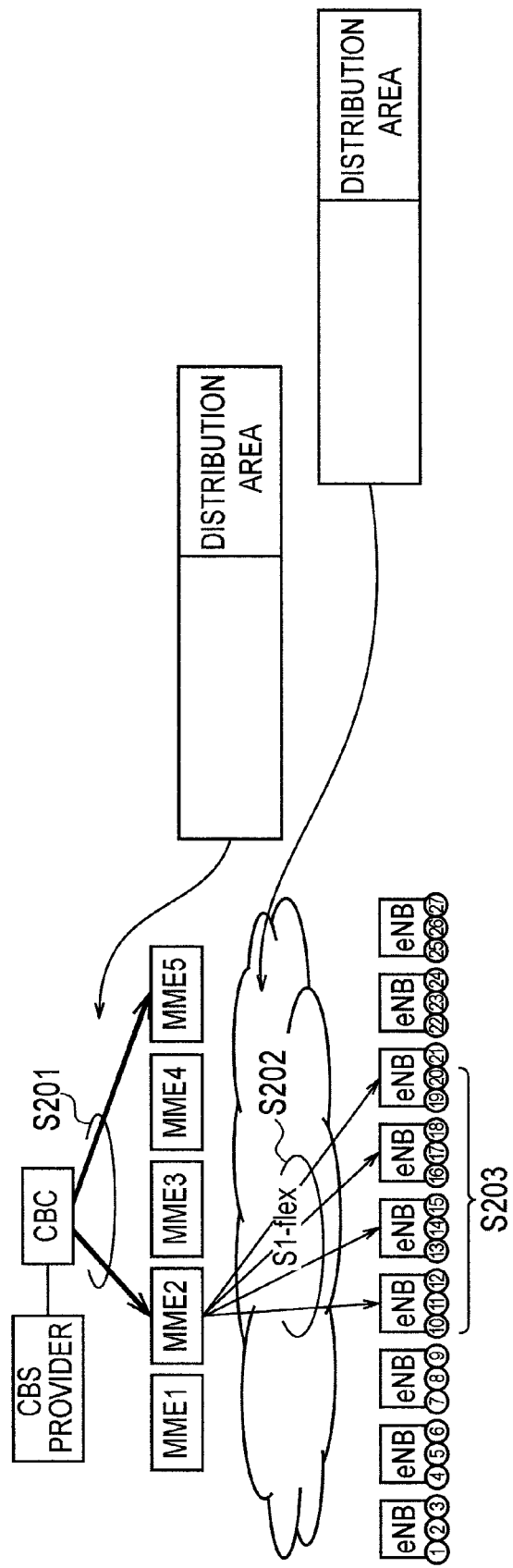
FIG. 3 is a diagram for illustrating a method of transmitting emergency information in the mobile communication system according to the first embodiment of the present invention.

As FIG. 3 shows, in Step S201, on the basis of emergency information received from the CBS provider, the broadcast equipment CBC determines a distribution area of the emergency information. Then the broadcast equipment CBC transmits the ETWS message including the distribution area and the emergency information to switching centers MME2 and MME5 which correspond to the distribution area.

Here, the broadcast equipment CBC stores therein a mapping table for "Distribution Area" and "Switching center," and determines the distribution area of the ETWS message (emergency information) with reference to the mapping table.

In Step S202, the switching centers MME2 and MME5 having received the ETWS message each transfer the received ETWS message to radio base stations eNB corresponding to the distribution area included in the received ETWS message.

Here, each of the switching centers MME stores therein a mapping table for "Distribution Area" and "Radio Base Station," and thus extracts a radio base station eNB corresponding to the distribution area in the ETWS message (emergency information) with reference to the mapping table.

In Step S203, the multiple radio base stations eNB having received the ETWS message broadcast the emergency information included in the ETWS message to cells 10 to 20 which correspond to the distribution area included in the ETWS message thus received.

Here, each of the radio base stations eNB stores therein a mapping table for "Distribution Area" and "Cell," and thus extracts a cell corresponding to the distribution area in the ETWS message (emergency information) with reference to the mapping table.

Thirdly, with reference to FIG. 4, description will be given of a method (3) of transmitting an ETWS message in the emergency information notification system according to this embodiment.

Figure 4:
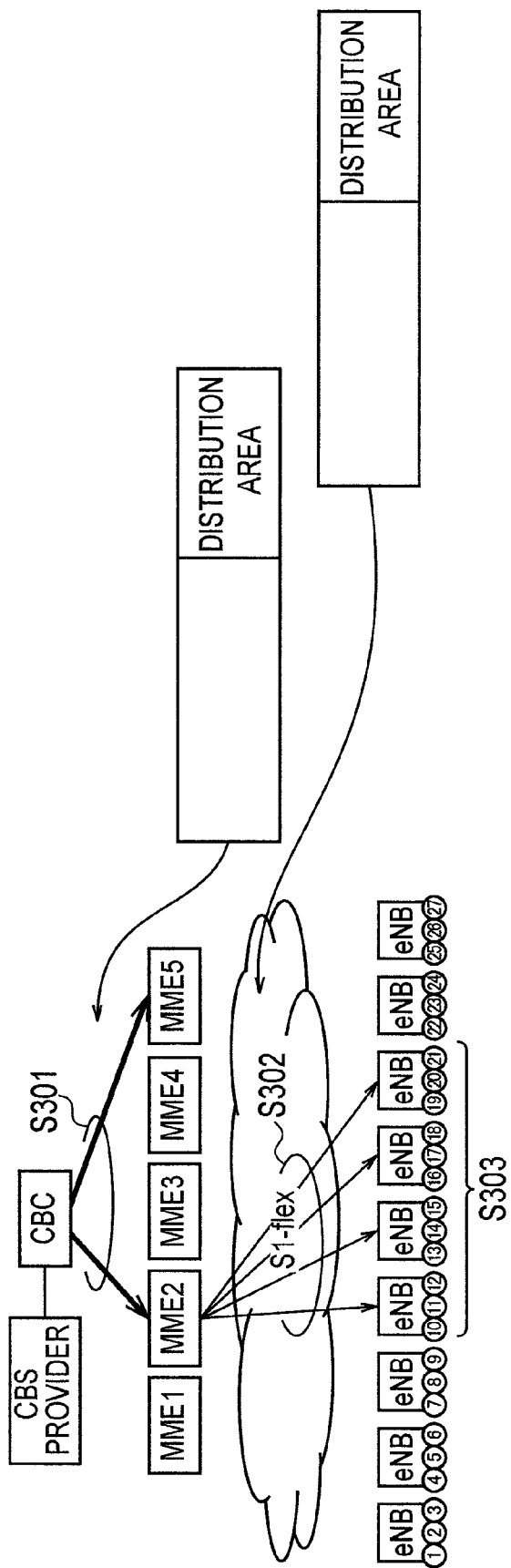
FIG. 4 is a diagram for illustrating a method of transmitting emergency information in the mobile communication system according to the first embodiment of the present invention.

As FIG. 4 shows, in Step S301, on the basis of emergency information received from the CBS provider, the broadcast equipment CBC determines a distribution area of the emergency information. Then the broadcast equipment CBC transmits the ETWS message including the distribution area and the emergency information to switching centers MME2 and MME5 which correspond to the distribution area.

Here, the broadcast equipment CBC stores therein a mapping table for "Distribution Area" and "Switching center," and determines the distribution area of the ETWS message (emergency information) with reference to the mapping table.

In Step S302, the switching centers MME2 and MME5 having received the ETWS message each transfer the received ETWS message to radio base stations eNB corresponding to the distribution area included in the received ETWS message.

Here, each of the switching centers MME stores therein a mapping table for "Distribution Area" and "Radio Base Station," and thus extracts a radio base station eNB corresponding to the distribution area in the ETWS message (emergency information) with reference to the mapping table.

In Step S303, the multiple radio base stations eNB having received the ETWS message broadcast the emergency information included in the received ETWS message to all the cells 10 to 21 under the control of the multiple radio base stations eNB.

Fourthly, with reference to FIG. 5, description will be given of a method (4) of transmitting an ETWS message in the emergency information notification system according to this embodiment.

Figure 5:
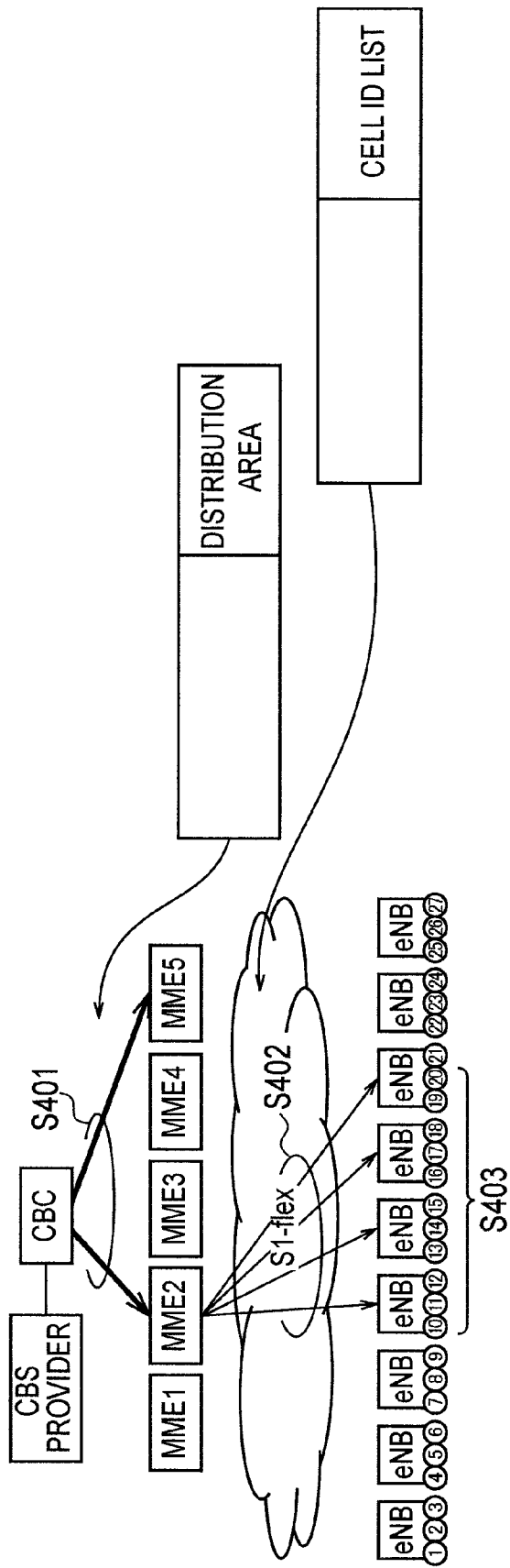
FIG. 5 is a diagram for illustrating a method of transmitting emergency information in the mobile communication system according to the first embodiment of the present invention.
Figure 6:
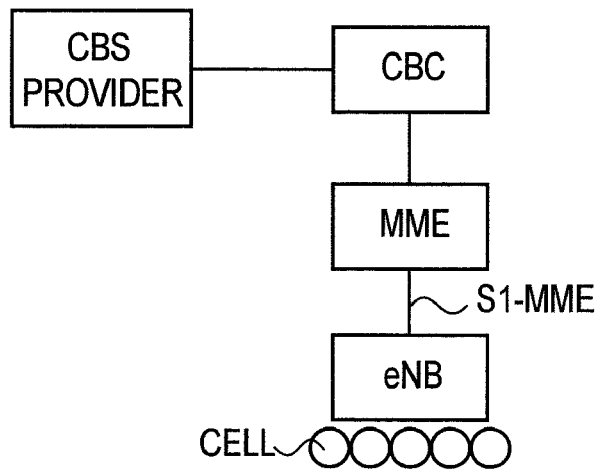
FIG. 6 is a diagram showing a configuration of a mobile communication system which provides an ETWS service in the EPC system or in the E-UTRAN system.

As FIG. 5 shows, in Step S401, on the basis of emergency information received from the CBS provider, the broadcast equipment CBC determines a distribution area of the emergency information. Then the broadcast equipment CBC transmits the ETWS message including the distribution area and the emergency information to switching centers MME2 and MME5 which correspond to the distribution area.

Here, the broadcast equipment CBC stores therein a mapping table for "Distribution Area" and "Switching center," and determines the distribution area of the ETWS message (emergency information) with reference to the mapping table.

In Step S402, the switching centers MME2 and MME5 having received the ETWS message each generate an ETWS message including information (cell ID list) for identifying cells 10 to 20 corresponding to the distribution area included in the received ETWS message. Then the switching centers MME2 and MME5 each transmit the cell ID list to radio base stations eNB which manages the cells 10 to 20.

Here, the switching centers MME each store therein a mapping table for "Distribution Area" and "Cell," and thus extracts a cell corresponding to the distribution area in the ETWS message (emergency information) with reference to the mapping table. On the basis of the extracted cell, the switching centers MME each generate an ETWS message including the cell ID list, and transmit the generated ETWS message to the same radio base station eNB.

In Step S403, the multiple radio base stations eNB having received the ETWS message broadcast the emergency information included in the ETWS message to cells 10 to 20 included in the ETWS message thus received.

(Advantageous Effect of Emergency Information Notification System According to First Embodiment of the Present Invention)

The emergency information notification system of the first embodiment of the present invention is capable of rapidly and correctly notifying multiple mobile stations in a distribution area of emergency information, in a mobile communication system of "EPC System" or of "E-UTRAN System."

(Modification)

Note that operation of the above described the broadcast equipment CBC, the switching centers MME and the radio base stations eNB may be implemented by means of hardware, a software module executed by a processor, or a combination of both.

The software module may be provided in any type of storage medium such as an RAM (Random Access Memory), a flash memory, a ROM (Read Only Memory), an EPROM (Erasable Programmable ROM), an EEPROM (Electronically Erasable and Programmable ROM), a register, a hard disk, a removable disk, or a CD-ROM.

The storage medium is connected to the processor so that the processor can read and write information from and to the storage medium. Also, the storage medium may be integrated into the processor. Also, the storage medium and the processor may be provided in an ASIC. The ASIC may be provided in the broadcast equipment CBC, the switching centers MME and the radio base stations eNB. Also, the storage medium and the processor may be provided in the broadcast equipment CBC, the switching centers MME and the radio base stations eNB as a discrete component.

Hereinabove, the present invention has been described in detail using the above embodiment; however, it is apparent to those skilled in the art that the present invention is not limited to the embodiment described herein. Modifications and variations of the present invention can be made without departing from the spirit and scope of the present invention defined by the description of the scope of claims. Thus, what is described herein is for illustrative purpose, and has no intention whatsoever to limit the present invention.

The invention claimed is:

1. An emergency information notification system configured to notify a plurality of mobile stations in a distribution area of emergency information, the emergency information notification system comprising:
 a radio base station;
 a switching center; and
 a broadcast equipment configured to transmit an emergency information notification message including the distribution area and the emergency information to the switching center which corresponds to the distribution area, wherein
 the switching center extracts the radio base station which corresponds to the distribution area included in the received emergency information notification message, generates an emergency information notification message including a cell identification information and the emergency information, and transmits the generated emergency information notification message to the extracted radio base station, and
 the radio base station broadcasts the emergency information included in the received emergency information notification message, to a cell corresponding to the cell identification information included in the emergency information notification message.

2. The emergency information notification system according to claim 1, wherein,
 in a case where there are a plurality of switching centers which manage the radio base station, and the radio base station receives the same emergency information notification message from different switching centers, the radio base station broadcasts only the emergency information included in the emergency information notification message which the radio base station receives for the first time.

3. The emergency information notification system according to claim 1, wherein,
 in a case where there are a plurality of switching centers which correspond to the distribution area, the broadcast equipment transmits the emergency information notification message to a switching center having the best connection status with the broadcast equipment among the plurality of switching centers.

4. The emergency information notification system according to claim 1, wherein,
 in a case where there are a plurality of switching centers which manage the radio base station, and the radio base station receives the same emergency information notification message from different switching centers, the radio base station broadcasts only the emergency information included in the emergency information notification message which the radio base station receives for the first time.

5. The emergency information notification system according to claim 1, wherein,
 in a case where there are a plurality of switching centers which manage the radio base station, and the radio base station receives the same emergency information notification message from different switching centers, the radio base station discards the emergency information notification messages other than the one which the radio base station receives for the first time.

* * * * *